United States Patent [19]
Vosbury

[11] Patent Number: 5,138,708
[45] Date of Patent: Aug. 11, 1992

[54] DIGITAL PROCESSOR USING CURRENT STATE COMPARISON FOR PROVIDING FAULT TOLERANCE

[75] Inventor: Newman A. Vosbury, Roswell, Ga.

[73] Assignee: Unisys Corporation, Blue Bell, Pa.

[21] Appl. No.: 389,196

[22] Filed: Aug. 3, 1989

[51] Int. Cl.$^5$ .................... G06F 9/30; G06F 9/38; G06F 11/08; G06F 11/34

[52] U.S. Cl. .................... 395/575; 364/221.7; 364/228.3; 364/229; 364/230; 364/230.3; 364/230.5; 364/265; 364/266.4; 364/266.5; 364/266.6; 364/267.5; 364/267.6; 364/268.1; 364/267.8; 364/268.9; 364/269.4; 364/231.8; 364/DIG. 1

[58] Field of Search .................... 371/15.1, 7, 11.1, 30, 371/47.1, 48, 72, 40.2, 23, 24, 29.1, 14; 364/807, 200 MS File, 900 MS File; 395/575

[56] References Cited

U.S. PATENT DOCUMENTS

| | | | |
|---|---|---|---|
| 4,805,107 | 2/1989 | Kieckhafer et al. | 364/200 |
| 4,816,989 | 3/1989 | Finn et al. | 364/200 |
| 4,972,363 | 11/1990 | Nguyen et al. | 364/807 |
| 4,980,857 | 12/1990 | Walter et al. | 364/900 |

Primary Examiner—Thomas C. Lee
Assistant Examiner—Daniel H. Pan
Attorney, Agent, or Firm—Albert B. Cooper; Mark T. Starr

[57] ABSTRACT

A highly fault-tolerant processor is comprised of first and second central processing units (CPU) executing the same instruction sequence. Each CPU provides a state vector representing the current state thereof. The current state of each CPU is defined by the contents of a set of appropriate registers of the CPU after the CPU has completed execution of an instruction. The bits comprising the state vectors are compared by EXCLUSIVE OR gates, the outputs of which being ORed to provide a fail flag indicative of whether or not the state vectors agree with respect to each other. The state previous to the current state is stored external to the CPUs in a state image storage. The external image of the previous state is stored by pushing the existing contents of each of the registers in the set from one of the CPUs into the external image storage prior to the contents of the register being changed pursuant to the execution of the current instruction.

6 Claims, 2 Drawing Sheets

DIGITAL PROCESSOR USING CURRENT STATE COMPARISON FOR PROVIDING FAULT TOLERANCE

BACKGROUND OF THE INVENTION

1. Field of the Invention

The invention relates to digital processors, particularly with respect to an architecture thereof that provides highly fault-tolerant performance in multiprocessor parallel operation and uniprocessor sequential operation.

2. Description of the Prior Art

Multiprocessor parallel operation and uniprocessor sequential operation computer systems are prevalent present-day computer architectures. Multiprocessor systems traditionally share common memory and perform relatively short sequences or threads of instructions in parallel. The parallelism of such systems often gets quite fine. In a uniprocessor system, the instructions of a task are sequentially executed. Fault-tolerant operation is generally a desideratum of such systems. In fine grain parallel processing, the desirability of fault-tolerance is even greater than in sequential processing. A failure of a processor in a parallel system, while executing one of several parallel execution paths, results in wasting the efforts of several processors. This condition is exacerbated when parallel execution threads converge and are followed by sequential processing. A break in a processor executing one of the threads may waste the work of all of the other processors.

The prior art endeavors to effect fault-tolerance by utilizing an auxiliary processor identical to the primary processor. The auxiliary processor operates in lock-step with the primary processor such that both processors simultaneously execute the same instruction of the same program thread. Whenever the thread being executed requires computer output, such as an external access to memory or to a message link, the outputs are compared and if disagreement is detected, the output is not utilized and the thread or the entire program is rerun. This technique is used in both multiprocessor and uniprocessor architectures. The disadvantage of this approach is that the instruction execution error that resulted in the erroneous output may have occurred a number of instruction execution cycles prior to the output and at the time of the output had been obscured by the subsequent processing. The only recovery option then is rerunning a significant portion of the program which is an extremely time wasteful procedure.

Tightly-coupled multiprocessor systems used in fast real-time processing provide high throughput and reliability. Although fault-tolerance in sequential systems is significant, it is believed to be more important in such parallel processing for hard real-time systems. The consequences of re-executing a segment of computation are sufficiently undesirable for single processors but are exacerbated if multiple processors are involved.

SUMMARY OF THE INVENTION

A highly fault-tolerant processor is comprised of first and second central processing units (CPU) executing the same program sequence, each providing a state vector representing the current state thereof. The current state of each CPU is defined by the contents of a set of appropriate registers of the CPU after the CPU has completed execution of an instruction. A failure flag is generated by comparing the two state vectors and setting the flag when the vectors disagree. The state previous to the current state is stored external to the CPUs in a state image storage. The external image of the previous state is stored by pushing the existing contents of each of the registers in the set from one of the CPUs into the external image storage prior to the contents of the register being changed pursuant to the execution of the current instruction.

DESCRIPTION OF THE PREFERRED EMBODIMENT

Figure 1:
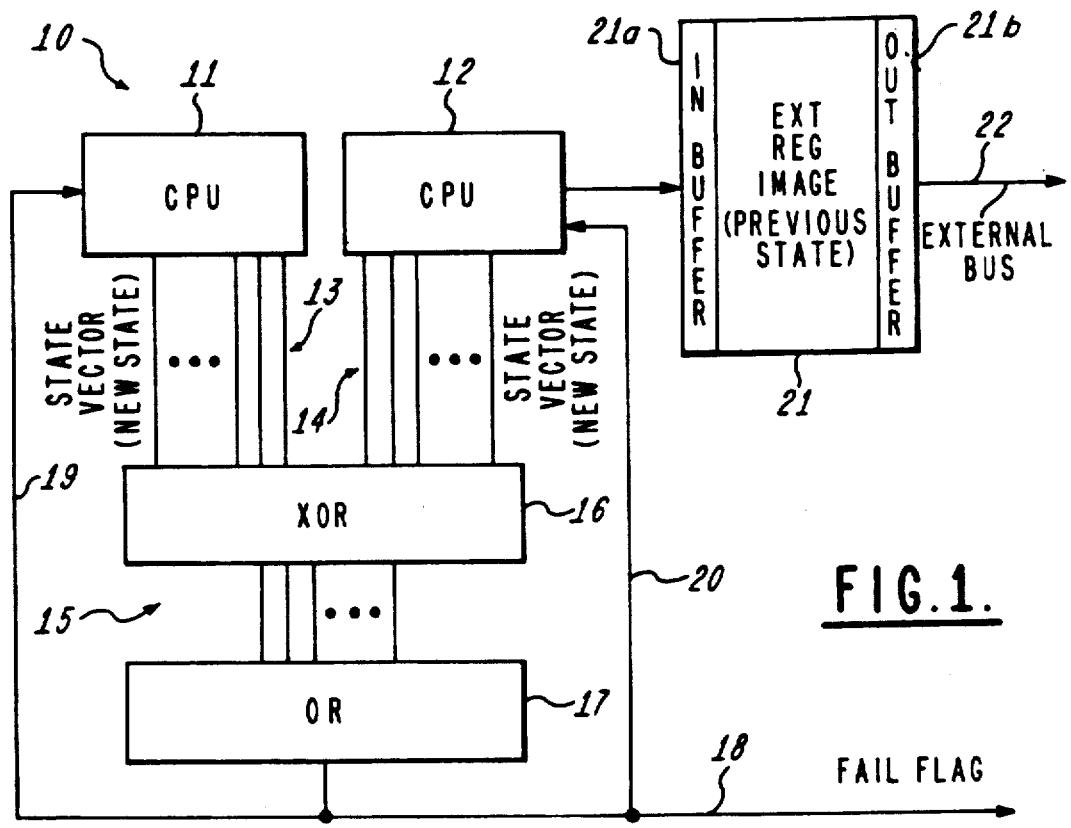
FIG. 1 is a schematic block diagram of a highly fault-tolerant processor which may be utilized in single processor or multiprocessor systems.

Referring to FIG. 1, the architecture of a highly fault-tolerant processor (HFTP) 10 implemented in accordance with the present invention is illustrated. The HFTP 10 is preferably implemented on one chip and includes a central processing unit (CPU) 11 and a CPU 12. The CPUs 11 and 12 are identical with respect to each other in hardware and software and in operation execute the same instruction stream in lock step. The CPUs 11 and 12 are tightly coupled with respect to each other. The CPU 11 provides a state vector on lines 13 and the CPU 12 provides a state vector on lines 14. The state vector lines 13 are connected, respectively, to a set of points internal to the CPU 11 which are identical to a set of points internal to the CPU 12 to which the state vector lines 14 are connected. The state vector represents all of the bits contributing to the final state of the CPU at the end of an instruction execution. The bits defining the CPU state vary in accordance with the design of the CPU and it is well recognized which bits fully define the state. The state is represented by such bits as condition codes, effective address of an operand, branch displacements, and the like. Generally, the entire state of the CPU executing an instruction is expressed in the contents of the register set thereof. For example, condition codes form part of the state that result from conditions such as "greater than" or "less than" comparisons. Such comparisons may be utilized to set branch addresses. The bits and registers defining the state may be hidden or visible. Data and address registers may also be utilized in defining the CPU state. Additionally, bits controlling the addressing mode and bits describing address attributes such as displacement or a base register indicator may also be included in the state definition.

The CPUs for use in the HFTP 10 may be designed by those normally skilled in the art such that the entire state of the CPU is defined by a final register set that would store significant contents at the end of an instruction execution. Alternatively, using a predetermined CPU architecture, one normally skilled in the art knows precisely which registers and bits at the end of a machine instruction cycle defines the state of the machine. Thus, the state vector is comprised of all registers and bits in the CPU required to define the state of the CPU.

A predetermined architecture is analyzed to define the minimum set of registers or indicators that depict the state of the CPU. The bit indications may be in the micro-code or the hardware of the machine.

The state vectors on the lines 13 and 14 are applied to comparison circuits 15 to determine if the state vectors from the CPU 11 and the CPU 12 are the same or different at the end of the execution of each instruction. If the state vectors differ after executing an instruction, a failure in the processor 10 has occurred. The comparison circuits 15 are implemented by EXCLUSIVE OR gates 16 responsive to the lines 13 and 14 followed by a multi-input OR gate 17. Corresponding bits from the CPUs 11 and 12 are XORed together in the XOR gates 16 and the results of the EXCLUSIVE ORing are ORed in the OR gate 17. The output of the OR gate 17 on a line 18 represents the processor fail flag. If the result of the OR is true, then the fail flag on the line 18 is set. The fail flag is also applied as internal interrupts to the CPU 11 and the CPU 12 via lines 19 and 20, respectively, to place the processor 10 into a failure or wait state when the fail flag on the line 18 is set. When failure is detected, the processor 10, via the lines 19 and 20, is prevented from outputting any data to memory or onto communication links.

The state vectors of the CPU 11 and the CPU 12 represent the new state of the processor 10 after the execution of the current instruction. An external register image storage 21 stores the previous state of the processor 10. The external register image storage 21 includes an in-buffer 21a and an out-buffer 21b. The external register image storage 21, therefore, stores the state of the processor 10 that existed after executing the previous instruction. The previous state image is obtained when new information is written into a register during the execution of an instruction. When the new information is written into the register, the previous contents thereof are pushed into the in-buffer 21a of the external image storage 21. The outputs of all the registers and indicators of the CPU required to define the state thereof are pushed into the in-buffer 21a of the external register image 21. Thus, the total previous state of the processor 10, as expressed in the registers thereof and other indicators, is presented in the out-buffer 21b of storage 21 while the new total state is depicted by the state vectors and in the in-buffer 21a. If no error is detected, the in-buffer is copied into the out-buffer.

Consider an execution path P comprised of individual instructions $P_1, P_2, P_3, \ldots, P_I, \ldots, P_N$. The entire state of the processor 10 executing P is expressed in the register set and state indicators of the CPUs 11 and 12 as described above. In the HFTP 10, whenever a register or indicator defining the state is written to, the prior contents thereof are pushed into the in-buffer 21a of the external image storage 21. Thus, at the end of an instruction $P_I$, the prior state of the system, $S_{I-1}$, is expressed in the out-buffer 21b of the external image storage 21. If the processor 10 should fail at instruction $P_I$, the processor state $S_{I-1}$ stored in the out-buffer 21b of the external register image storage 21 represents the state of the processor 10 just prior to the failure. The prior state of the processor 10 is externally visible on an external bus 22. If the processor 10 does not fail on $P_I$, the state in the in-buffer 21a is moved into the out-buffer 21b.

As described above, preferably all of the components 11–22, which include the two CPUs 11 and 12, the compare circuitry 15 and the interface 22 to the external state image, are all fabricated on one chip. The HFTP 10 compares the internal operation thereof in every detail that relates to setting the processor state at the end of an instruction. The compare circuitry 15 is applied to every aspect of the processor state. In the prior art utilizing dual-processor comparator systems, comparisons are made only with respect to external accesses such as external accesses to memory or data outputted on message links. The processor 10 provides the external fail flag on the line 18 and internal interrupts on the lines 19 and 20 when the compare circuitry 15 indicates error. The HFTP 10 stops on error and renders the prior state before the error occurred externally visible by representing the state of the processor in the register file thereof and pushing each register's contents into the external image 21 whenever writing is performed into the register.

It is appreciated from the foregoing with respect to the HFTP 10 that any failure in the execution of an instruction is immediately recognized by the failed processor with the effects of the failure contained within the processor. When a processor fails, the fail flag thereof on the line 18 is set. The failed processor then enters a failure or wait state in response to the interrupts on the lines 19 and 20. Execution up to the failure point is known to be correct and the prior correct state of the failed processor, immediately prior to the failed instruction, is externally accessible via the external bus 22. In a multiprocessor system, when a processor fails, another processor continues the execution thread to completion without losing any computation. Thus, the system remains operative whenever one or more processors fail and at least one processor remains functional. This is achieved by utilizing the architecture of the HFTP 10 since execution up to the point of observed failure is correct and the processor state just prior to the execution of the failed instruction is visible to the other processors of the system.

It is appreciated from the foregoing that fault tolerance in a computer system is the ability to recognize an error condition and recover from it without any loss of data and with a minimal loss of time. The HFTP 10 can be utilized in a sequential, uniprocessor system or in a parallel, multiprocessor system.

When the HFTP 10 is utilized as a uniprocessor, it is desirable for the system to stop on error, retry the failed operation a number of times, and then halt if the operation is continuously unsuccessful. The capabilities of the HFTP 10 permit the operating system to provide for such a retry of failed operations. This is achieved by the interrupt caused by the processor fault invoking an error retry procedure. The retry procedure increments an error count and if the count is not excessive, reloads the state of the processor from the external prior state image and begins execution again, thereby retrying the failed instruction. If the retry fails and the error count is excessive, the uniprocessor is placed into a diagnostic routine. Additionally, an alarm may be generated or the system may simply halt. Thus, in a uniprocessor system, the occurrence of an error causes the processor to be interrupted. The operating system recovers the saved prior state and retries the failed instruction.

When the HFTP 10 is utilized in a multiprocessor system, for example, a tightly-coupled system, the processor in error signals the other processors via the fail flag, stops and permits another processor to assume the execution thread of the failed processor. The failed processor could then go into diagnostics. Preferably, the fault-tolerance is supported by the operating system.

In a multiprocessor system oriented toward a high degree of parallelism, each processor searches for execution tasks when it completes an execution thread. The first place to look is the set of processor fail flags that are either mapped into shared memory or on a bus and are accessible to all of the processors in the system. The processor fail flags signify that a processor has failed and its execution thread requires completion. This is the fault-tolerant support provided by the operating system. A processor observing a fail flag that is set, locks access to the failed processor, loads the prior state of the failed processor from the external register image 21 thereof and continues the execution of the thread the failed processor was performing starting from the failed instruction.

The external image of the processor state as well as the fail flag are accessible to any processor via conventional techniques such as shared memory or bus access. A processor that is searching for execution to be performed first examines the processor fail flags. If a flag is set, the processor immediately acquires the prior state of the failed processor and completes the execution thread. Code to be executed and associated data are maintained in shared memory accessible to all processors. Locking access to a processor is achieved by conventional semaphores or equivalent mechanisms.

Thus, in a multiprocessor system, the fault-tolerance is more complete compared to a uniprocessor system since there are plural processors to assume a failed execution thread. The operating system implements fault-tolerant parallelism by controlling each processor to search for execution to be performed when the processor completes executing an instruction thread. The processor first searches the set of fail flags. Preferably, in the multiprocessor system, all execution is performed out of shared memory. This architecture enables any processor to execute any process. When a processor fails at instruction $P_I$ of an instruction stream P, and another processor assumes the execution, the processor state $S_{I-1}$ is precisely the state required to begin execution with $P_I$. This assures that no instruction is omitted and no instruction is redundantly executed.

The fault-tolerant operation described is achieved providing there is a remaining operative processor. This occurs with the HFTP 10 because the compare circuitry 15 and external state image 21 assure, with extremely high probability, that the execution up to the failure was correct and that the correct processor state before the failure is available to other processors. When a processor fail flag is detected by an operative processor, the operative processor initializes itself to the state of the failed processor that existed prior to failure and continues the execution thread.

Figure 2:
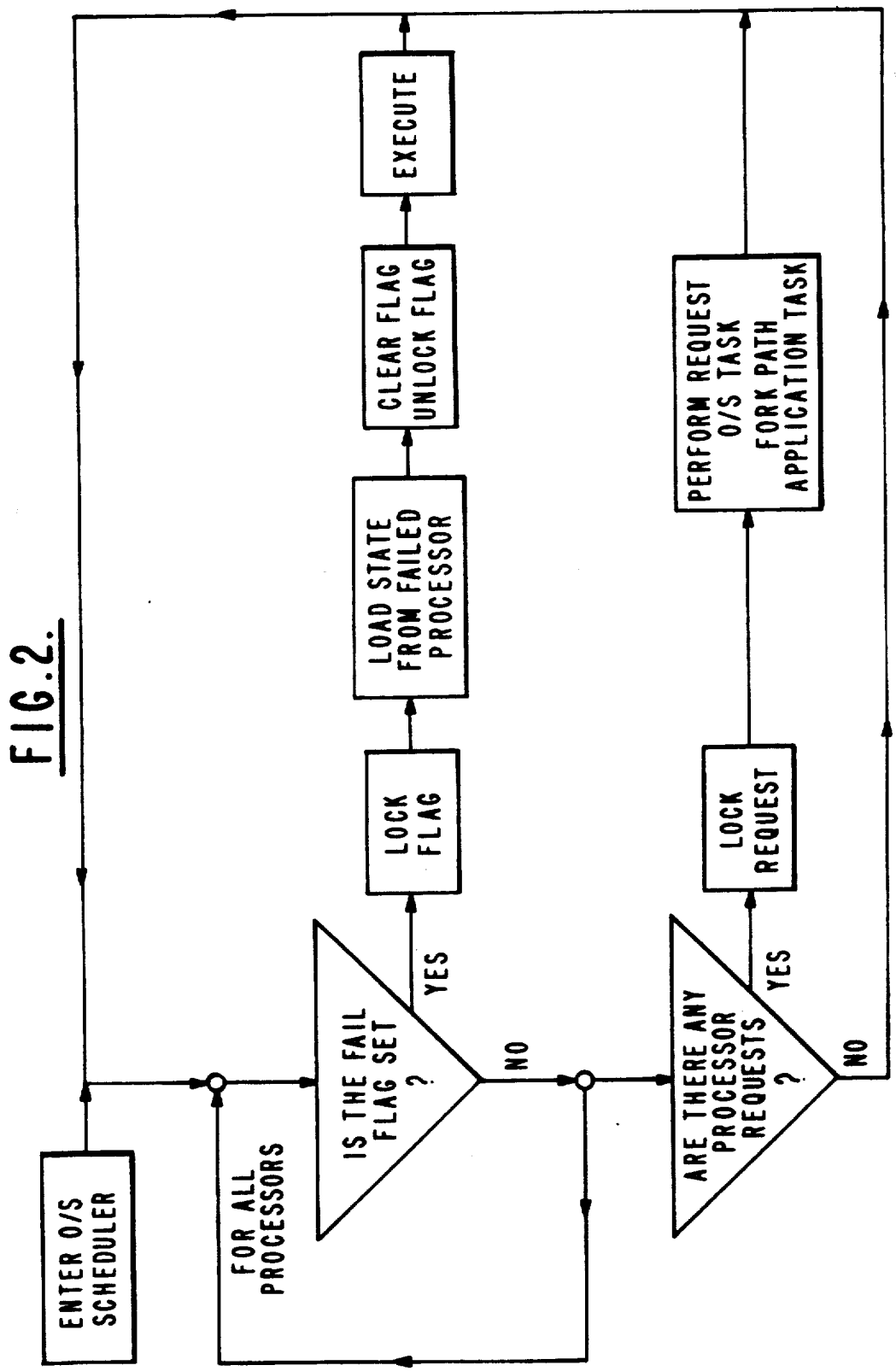
FIG. 2 is a schematic representation of a scheduler for an operating system that supports the multiprocessor configuration utilizing the processor of FIG. 1.

The HFTP 10 is advantageously utilized in a multiprocessor system with inherent parallelism. Programming constructs are desirable to exploit the parallelism with an operating system to support the programming constructs and the fault-tolerant capabilities of the processor. The processor 10 provides the high degree of fault-tolerance required in such a system. Referring to FIG. 2, a scheduler for such an operating system is illustrated. As is observed in the scheduler of FIG. 2, each processor searches for work and first determines if any fail flag is set. If no flag is set, the processor looks for processor requests to perform. When a processor is finished with a thread of execution, the processor returns to look for more work. Since, preferably, all user code is executed out of shared memory, any processor can perform any thread of execution. The processors looking for work automatically balance loads. Preferably, processing requests are queued by priority as a result of scheduling operating system tasks, loading application tasks, and interrupts or FORKs, in a manner to be further described with respect to FIG. 3.

Figure 3:
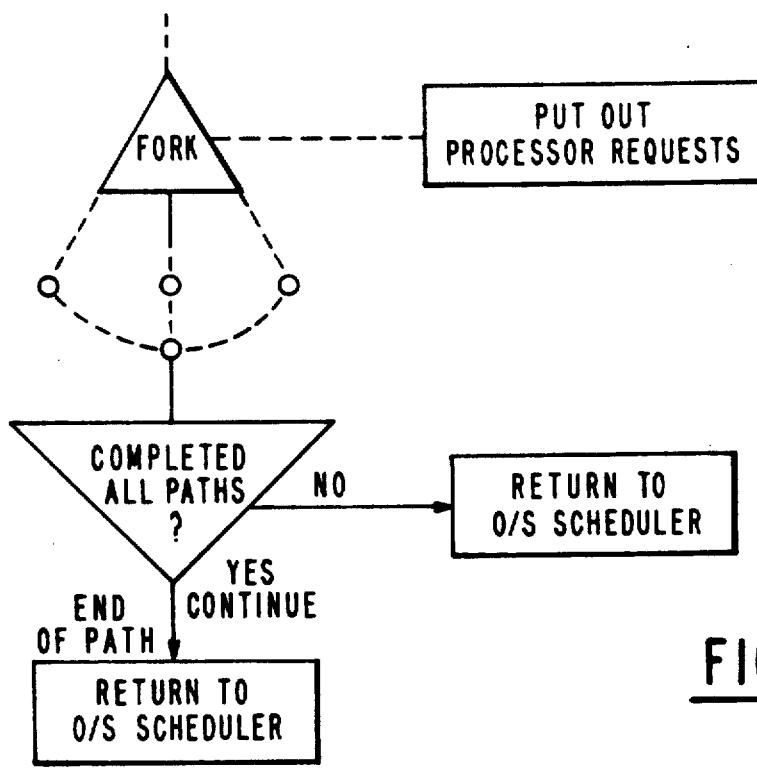
FIG. 3 is a schematic representation of a language construct used in combination with the scheduler of FIG. 2 to advantageously utilize the processor of FIG. 1.

A programming construct to exploit the parallelism described may be configured as a Conditional Prioritized FORK (CPF). Such a construct enables a program to express parallel control of a multiprocessor environment in a way that can be highly sensitive to conditions in the system. The CPF is supported by the operating system. The implementation of the CPF is coordinated with the operating system and the hardware concepts of the HFTP 10 described above to provide fault-tolerance. The FORK language construct establishes the execution of plural paths by the plural system processors in accordance with system conditions. The construct provides the flexibility of a processor encountering a FORK, executing one path and putting out processor requests for the other paths to be performed by the other processors of the system. FIG. 3 exemplifies a FORKed execution path. It is appreciated that all execution paths lead to a return to the operating system (O/S) scheduler of FIG. 2.

Thus, processor requests are submitted when a FORK is encountered in execution. A processor searches for different types of execution in the following order:
1) processor fail flags,
2) processor requests,
3) ready queue.

The ready queue contains requests for main tasks to be executed, having been initially loaded. The operating system maintains a data structure in shared memory in which processor requests are placed, reflecting FORKs in user code. The required state data for a processor to begin the execution thread is preferably in the request. Thus, execution of a FORK causes processor requests to be put out for all but one of the parallel paths. The current processor performs the one path. The operating system schedules the work as discussed with respect to FIG. 2.

HFTP advantageously provides high reliability, fault recovery without repetition of computation, and rapid recovery. The probability of meeting port-to-port time requirements is high even with processor failure. The operating system constructed to operate in the manner described above utilizing the hardware of FIG. 1 can perform the functions described with low overhead.

The HFTP 10 of FIG. 1 was described with the state defining bits from the CPU 12 pushed into the in-buffer 21a of the external register image storage 21. It is appreciated that alternatively the external image may be derived from the CPU 11. As a further alternative, the external image may be derived from either the lines 13 or the lines 14 rather than directly from the CPU 11 or the CPU 12. In this arrangement, the state vector would be held in the storage 21 until the successful completion of the current instruction, at which time the current state vector would replace the state vector in the storage 21 to become the previous state image for the next instruction cycle. The fail flag signal on the line 18 could be utilized to strobe the appropriate state vector into the storage 21 upon successful execution of the instruction. If an instruction should fail, the previous state vector would continue to be stored in the external register image 21 for use in the fault-tolerant procedures described herein.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. A digital processor for providing fault tolerance, comprising first and second central processing units (CPU), said first and second CPUs being identical with respect to each other and adapted to execute the same sequence of instructions $P_1, P_2, \ldots, P_I, \ldots, P_N$, said first and second CPUs simultaneously executing the same instruction $P_I$, each said CPU having a total current state $S_I$ after the execution of each instruction $P_I$ and a total prior state $S_{I-1}$ after the execution of each instruction $P_{I-1}$, each said CPU providing a state vector signal representative of the total current state $S_I$ thereof after the execution of each said instruction $P_I$, said state vector signal from said first CPU being provided from a first set of points internal to said first CPU, said first set of points completely defining the state of said first CPU, said state vector signal from said second CPU being provided from a second set of points internal to said second CPU, said second set of points completely defining the state of said second CPU, said first set of points internal to said first CPU being identical to said second set of points internal to said second CPU, comparison means responsive to said state vector signals from said first and second CPUs for comparing said state vector signals from said first and second CPUs after execution of each said instruction $P_I$ for providing a fail flag signal representative of processor failure when said state vector signals disagree, state image storage means coupled to said first CPU for storing a state image signal representative of the total prior state $S_{I-1}$ of said first CPU after the execution of each said instruction $P_{I-1}$, said state image signal being identical to said state vector signal from said first CPU, means responsive to said fail flag signal for halting instruction execution of said processor when said fail flag signal is representative of said processor failure, and means responsive to said state image signal for providing said state image signal for use external to said processor when said fail flag signal is representative of said processor failure, so that said state image signal can be used to resume processing from a state just prior to an instruction during execution of which said failure occurred.

2. The processor of claim 1 wherein said comparison means comprises

EXCLUSIVE OR gate means responsive to said state vector signals from said first and second CPUs, and OR gate means coupled to said EXCLUSIVE OR gate means for providing said fail flag signal.

3. The processor of claim 1 wherein said first CPU includes registers internal thereto that completely define the state of said first CPU, said total current state $S_I$ being represented by the contents of said registers internal to said first CPU, said registers providing said first set of points, and said second CPU includes registers internal thereto that completely define the state of said second CPU, said total current state $S_I$ being represented by the contents of said registers internal to said second CPU, said registers providing said second set of points.

4. The processor of claim 3 wherein said state image signal stored in said state image storage means comprises existing contents of each said register when said register is written into pursuant to execution of each said instruction.

5. The processor of claim 1 wherein said means responsive to said fail flag comprises interrupt means.

6. The processor of claim 1 wherein said means for providing said state image signal comprises an external bus coupled to said state image storage means.

* * * * *